United States Patent [19]

Owens

[11] 4,239,127

[45] Dec. 16, 1980

[54] GRAVITY ASSISTED NEWSPAPER VENDING MACHINE WITH CUSTOMER-OPERATED NEWSPAPER LIFT DEVICE

[76] Inventor: Walter K. Owens, P.O. Box 1032, Crestview, Fla. 32536

[21] Appl. No.: 14,920

[22] Filed: Feb. 26, 1979

[51] Int. Cl.[3] .............................................. B65G 59/08

[52] U.S. Cl. ...................................................... 221/259

[58] Field of Search ............... 221/259, 213, 154, 227, 221/241, 220

[56] References Cited

U.S. PATENT DOCUMENTS

| | | | |
|---|---|---|---|
| 2,510,197 | 6/1950 | Summerfield | 221/259 X |
| 2,858,047 | 10/1958 | Williams et al. | 221/213 |
| 4,043,484 | 8/1977 | Vanjo | 221/213 |

*Primary Examiner*—Stanley H. Tollberg
*Attorney, Agent, or Firm*—B. P. Fishburne, Jr.

[57] ABSTRACT

A newspaper vending machine in conversion kit form allows the ready installation on existing or new vending machines of a simplified, reliable, durable and essentially theft-proof mechanism to dispense newspapers one at a time downwardly through a bottom outlet with the assistance of gravity. Variation in newspaper thickness has no adverse effect on the mechanism. A standard type coin mechanism is utilized.

10 Claims, 5 Drawing Figures

FIG.3
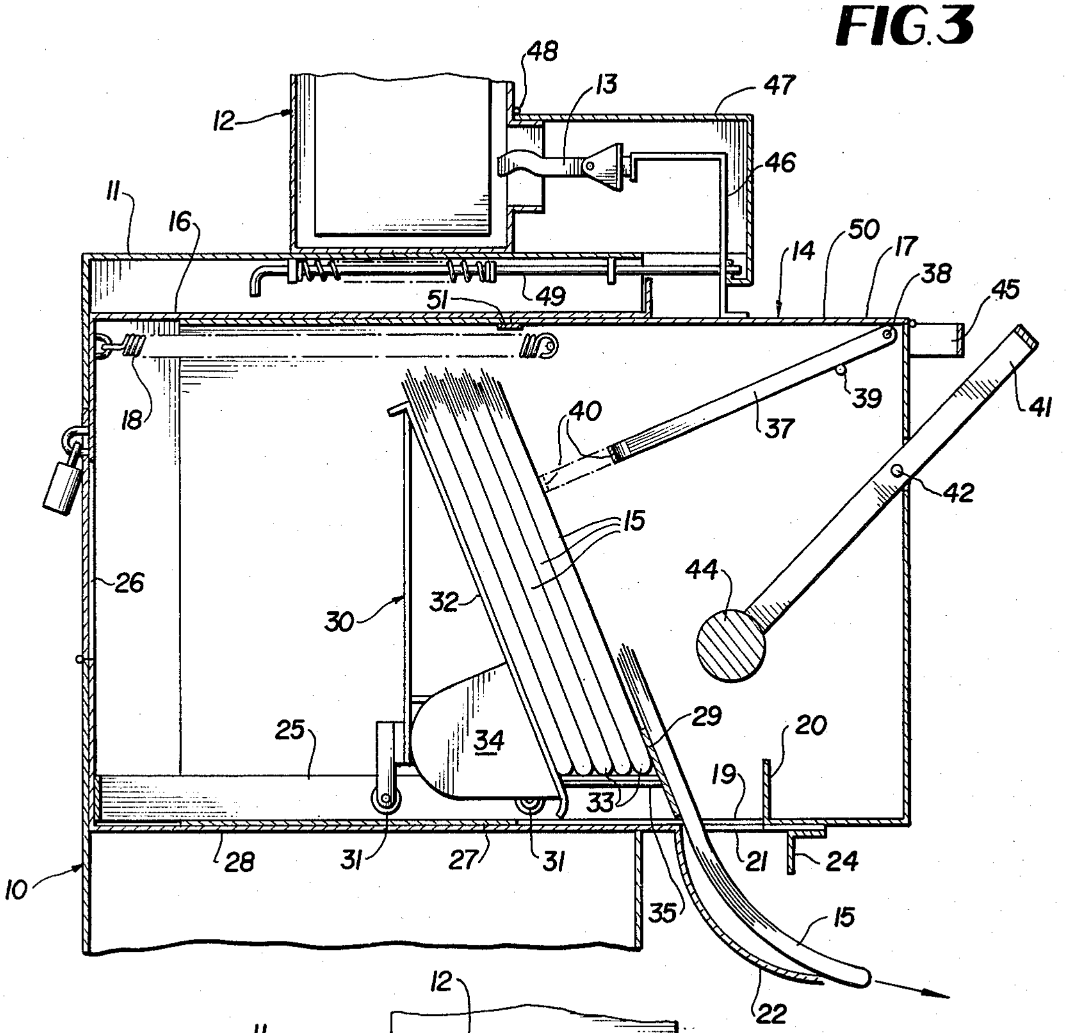
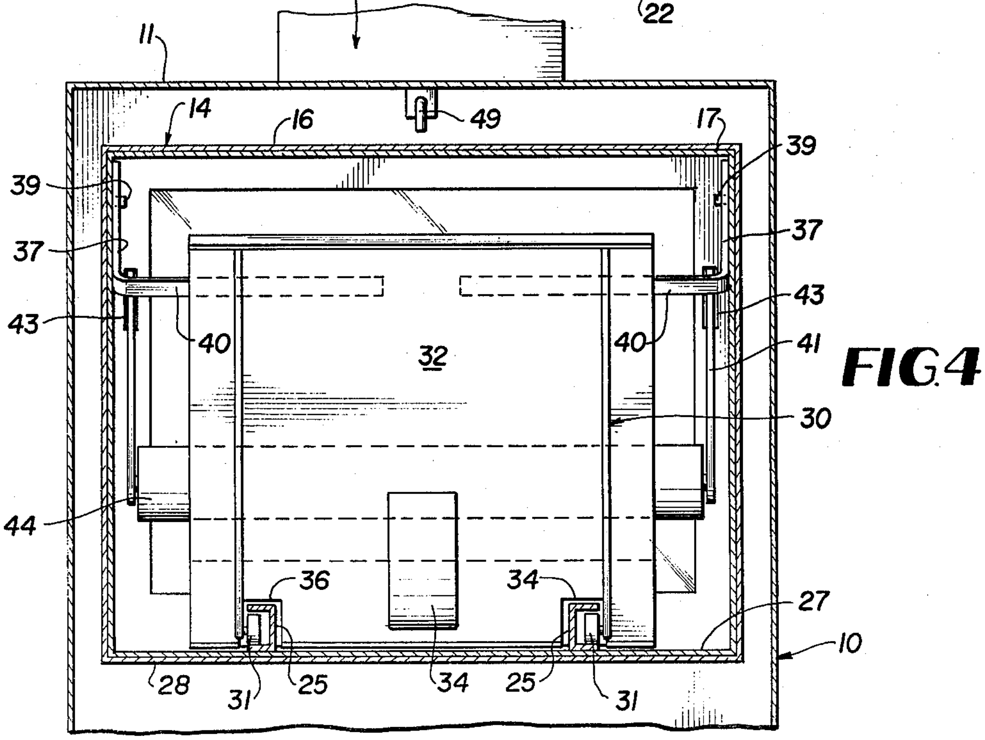
FIG.4

GRAVITY ASSISTED NEWSPAPER VENDING MACHINE WITH CUSTOMER-OPERATED NEWSPAPER LIFT DEVICE

BACKGROUND OF THE INVENTION

Newspaper vending machines principally of the semi-honor type are in wide usage. Such vending machines have a normally locked access door which is released for opening by the placement of proper coins in a conventional coin mechanism. The problem with these machines is that once the access door is released, there is nothing to prevent the customer or someone else from removing all of the newspapers from the storage compartment, and, unfortunately, such theft is widespread.

It is the object of this invention to deal with this problem in a simple and economical manner by provision of a conversion kit, by means of which existing semi-honor machines can be converted to theft-proof machines, in which a customer can receive only a single newspaper following the placement of proper coins in the coin mechanism and the manual operation of a secure and reliable dispensing or delivery mechanism.

In accordance with the invention, the forward and rear doors and the top wall of an existing semi-honor machine are removed. A new top wall is riveted into place and mounts a somewhat relocated standard coin mechanism at the top of the machine. A horizontal storage compartment for newspapers is mounted at the location of the removed front and rear doors and may extend both forwardly and rearwardly of the existing main cabinet body. In the illustrated embodiment the compartment is terminated at the rear wall of the existing main cabinet but extends forwardly of the cabinet front wall.

The storage compartment includes a fixed forwardly open box-like housing and a horizontally reciprocable rearwardly open box-like housing section telescoped within the fixed housing. The reciprocating housing section mounts the customer-operated newspaper delivery device as well as a pulling handle for this housing section which is spring-urged inwardly. The reciprocating housing section has a direct connection with the lock and release member of the standard coin control mechanism.

The stored newspaper within the two part housing rest on their folded edges in a steeply inclined attitude and are urged forwardly against a fixed abutment by a track-mounted spring-driven carriage which compensates for variations in newspaper thickness and gradual diminishment of the stack. A customer-operated lever lifts each forwardmost newspaper slightly to release it from behind the abutment and deliver it downwardly with the assistance of gravity through an outlet slot which is created only after the release and forward displacement of the reciprocating housing section and the simultaneous displacement of a retaining flange carried by the reciprocating housing section. A self-adjusting spring means on the reciprocating housing section bears against the upper portion of the newspaper stack to stabilize it and assure the delivery of papers one at a time to customers.

The invention also provides a unique locking system which may be opened by authorized personnel to load the storage compartment with newspapers in a convenient manner.

BRIEF DESCRIPTION OF THE DRAWINGS

FIG. 3 is a fragmentary vertical section, similar to FIG. 2, with the sliding inner compartment in a forward dispensing position.

FIG. 4 is a transverse vertical section taken on line 4—4 of FIG. 2.

DETAILED DESCRIPTION

Figure 1:
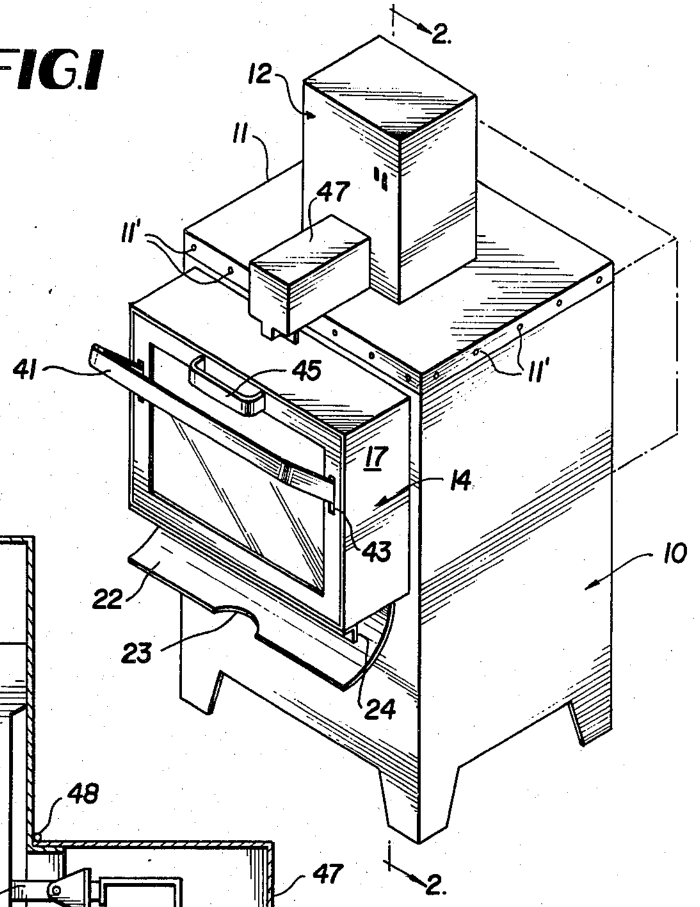
FIG. 1 is a perspective view of the invention according to a preferred embodiment thereof.

Referring to the drawings in detail wherein like numerals designate like parts, the numeral 10 designates a main rectangular cabinet body of a modified existing vending machine, such as a well-known semi-honor machine which has had its front and rear access doors and its top wall removed in order to receive the kit in accordance with the present invention. In some cases, the invention may be embodied in a wholly new machine, as previously noted, in which case the cabinet 10 or other support structure may be new.

The removed top wall of the converted semi-honor vending machine is replaced by a new top wall 11 having a marginal down-turned flange secured to the cabinet body 10 as by pop rivets 11'. The top wall 11 serves as a mounting surface for a relocated standard type coin mechanism 12 having a horizontally movable control arm 13 which is released to move forwardly from the position of FIG. 2 to the position of FIG. 3 following the placement of proper coins in the mechanism 12 by a customer.

The vending machine comprises a rectangular storage compartment 14 for newspapers 15 to be vended which includes a fixed interior forwardly open box-like housing section 16, somewhat below the top wall 11, and suitably secured to the cabinet body 10. The compartment 14 further comprises a horizontally shiftable box-like housing section 17 telescopically engaged within the fixed housing section 16 and having its rear end open. The movable housing section 17 is biased inwardly to a fully retracted or closed position against the back wall of the fixed housing section 16 by retractile spring means 18. The bottom wall of the movable housing section 17 has an opening 19 formed therethrough rearwardly of an upturned newspaper retainer flange 20 whose function will be described. The bottom wall of the fixed housing section 16 has a cooperative opening 21 formed therethrough adapted for registration with the opening 19 when a newspaper 15 is being dispensed, FIG. 3. Below the opening 21, the fixed housing section 16 has a curved deflector plate 22 preferably having a hand recess 23, FIG. 1, to guide the dispensed newspaper to the hand of the customer in a downward and forward direction, FIG. 3. Preferably, a stiffening member 24 is provided on the bottom wall of the fixed housing section 16 at its forward end.

A pair of spaced parallel horizontal channel tracks 25 are fixed to the rear vertical wall 26 of housing section 16 and extend forwardly to points adjacent the top of the deflector plate 22. The bottom wall 27 of the movable housing section 17 is able to telescope between the bottoms of channel tracks 25 and the bottom wall 28 of the fixed housing section 16.

The forward ends of channel tracks 25 are rigidly interconnected by a steeply inclined abutment plate 29 beneath which the bottom wall 27 may slide freely during the movement of the housing section 17. A carriage 30 for the stack of newspapers 15 has base wheels 31 guidingly engaged with the channel tracks 25 for horizontal movement. The carriage 30 includes an inclined rest plate 32 for the newspapers parallel to the abutment plate 29 and extending near the top unfolded edges of the inclined stacked newspapers. The abutment plate 29 is vertically shallow and merely laps the lower end portion of the frontmost newspaper in the stack. The folded edges 33 of the newspapers 15 are lowermost and rest on the upper horizontal edges of the tracks 25.

Mounted on the wheeled carriage 30 is a spring motor unit 34 of a conventional type connected by a cable 35 to the back of the abutment plate 29. As newspapers are dispensed one at a time from the front of the stack, the carriage including the back-up plate 32 will creep forwardly under influence of the spring motor 34 so that one newspaper at the front of the diminishing stack will always be held in firm engagement with the inclined abutment plate 29. The bottom edge of the plate 32 is slotted at 36, FIG. 4, to clear the channel tracks 25.

A pair of arms 37 are pivoted at 38 to the forward corners of movable housing section 17. Stop pins 39 on the side walls of the movable housing section limit downward movement of the arms 37 to inclined positions substantially normal to the stacked newspapers 15, FIGS. 2 and 3. At their free ends, the arms 37 have opposing inwardly projecting lateral leaf spring extensions 40 thereon which are tensioned to exert a yielding pressure on the forwardmost newspaper 15 of the stack to stabilize the stack, and to assure the proper dispensing of the newspapers one-by-one in the manner to be further described. The forward creeping action of the carriage 30 will assure that the newspaper stack, regardless of how many papers are in it, will always be held firmly between the back-up plate 32 and leaf spring elements 40 and between the plate 32 and the short abutment plate 39.

Also bodily mounted on the front of movable housing section 17 is a customer-operated vertically swingable lever 41 or frame pivoted as at 42 to the housing section 17 and projecting forwardly thereof through slots 43. Within the housing section 17, the lever 41 carries a cross axis newspaper lift roller 44 preferably having a sand covered periphery, or other friction face, and extending fully across the front of the newspaper stack. The sand roller 44 has a one-way clutch mechanism therein which locks the roller 44 against rotation when the handle bar of lever 41 is depressed by a customer to turn the lever 41 clockwise, FIG. 2. The locked roller 44 will frictionally engage the forwardmost newspaper 15 in the stack as the lever is swung toward the phantom line position in FIG. 2 and the friction between the roller and newspaper is sufficient to lift the forwardmost newspaper above the abutment plate 29. On the return stroke of the lever 41, the roller may rotate in the direction of the arrow, FIG. 2, and on the return stroke, the forwardmost newspaper shown in phantom lines in FIG. 2 will be nudged downwardly so that its folded edge 33 will enter between the front of the abutment plate 29 and the vertical retainer flange 20 while the movable housing section 17 remains in the innermost locked position under control of the arm 13 of the coin mechanism 12 which is not yet released. The manual lever 41 is free to be operated at any time to raise the forwardmost newspaper and place it in the position shown in phantom lines in FIG. 2, but the paper cannot be delivered to the customer until proper coins have been placed in the coin slots of the standard mechanism 12.

When such coins are placed, the mechanism control arm 13 is released and the customer uses a handle 45 on the front of housing section 17 to pull the housing section forwardly to the position of FIG. 3 where the leading newspaper 15 drops by gravity through the openings 19 and 21 of the two housing sections which are now in registration, FIG. 3. Forward movement of the housing section 17 causes the retainer flange 20 to separate from the fixed abutment plate 29 to thus release the forwardmost paper for dropping onto the deflector plate 22 and passing into the hand of the customer with the assistance of gravity.

The top wall of housing section 17 is connected to the coin mechanism control arm 13 by a connecting member 46 and both elements 13 and 46 are inside of a protective cover 47 hinged at 48 to the main body portion of the coin mechanism 12. The cover 47 is locked down by a spring-urged locking bolt 49 beneath the top wall 11 of the cabinet. In some cases, the protective cover 47 can also be externally padlocked for extra security.

It may also be mentioned here, in terms of security, that the bottom compartment of the cabinet 10 below the newspaper storage compartment 14 can be weighted down with sand bags up to 300 pounds or more.

Figure 2:
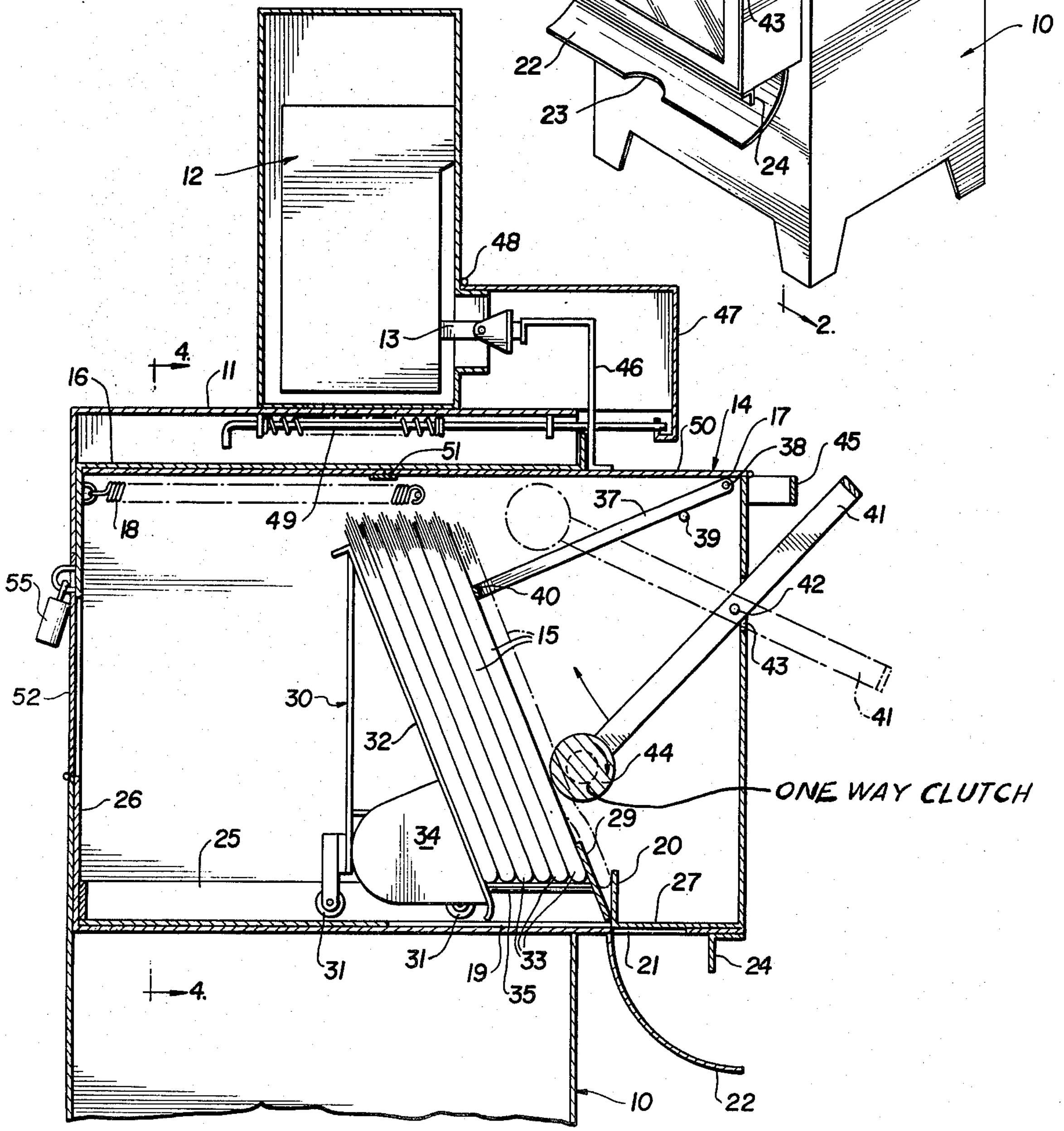
FIG. 2 is an enlarged vertical section through the machine in the front-to-back direction taken substantially on line 2—2 of FIG. 1 and showing the sliding inner compartment in a retracted closed position.
Figure 5:
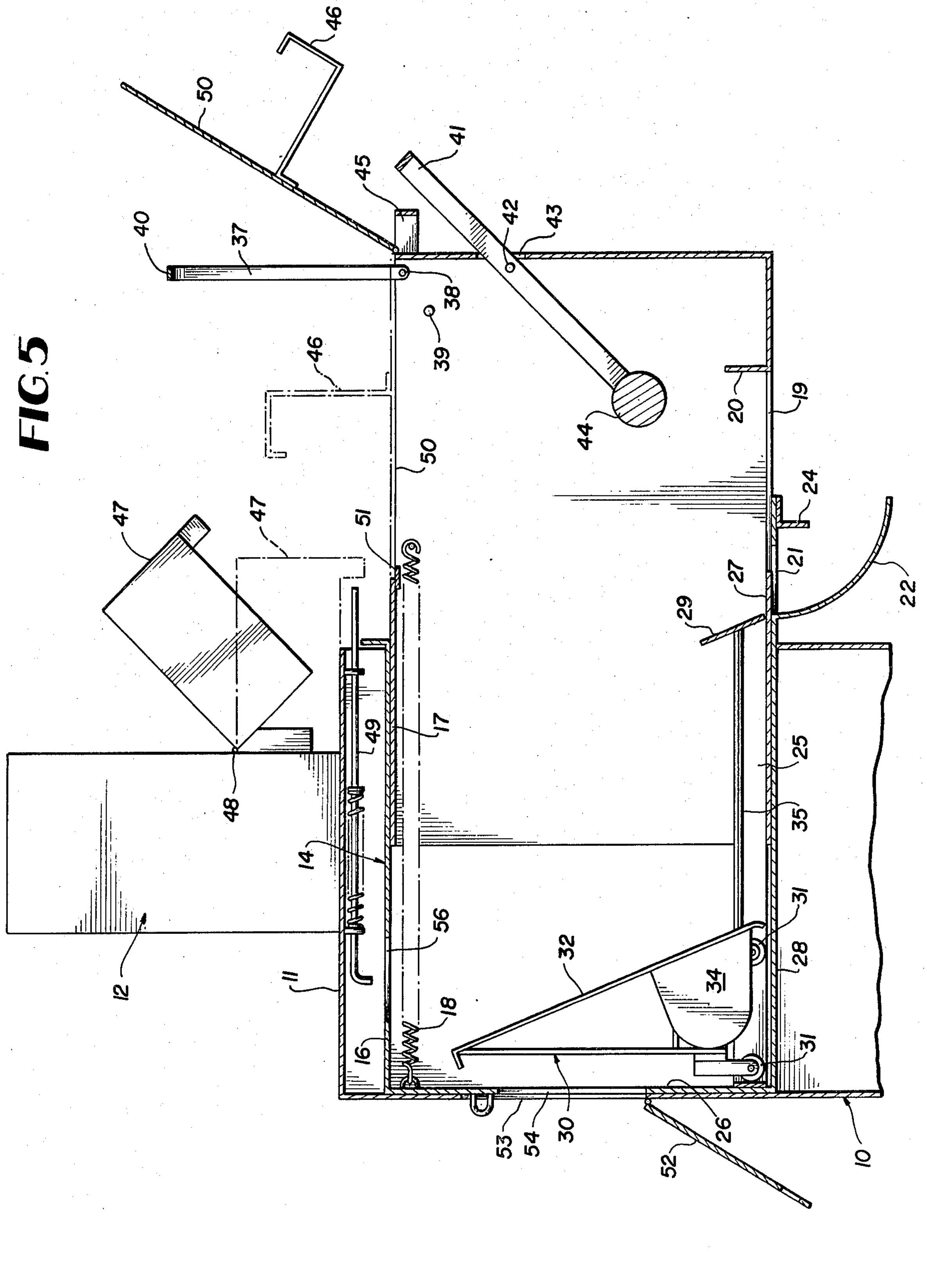
FIG. 5 is a vertical section through the machine with normally locked components thereof in open positions for loading newspapers and the inner sliding compartment or drawer in an advanced position to facilitate loading.

The movable housing section 17, FIG. 5, also has a hinged top wall panel 50 carrying the member 46 upon it and normally resting horizontally on a stop bar 51 beneath the top wall of the movable housing section. A further hinged access panel 52 is provided in the rear wall of cabinet 10 to cover access openings 53 and 54 in the cabinet and in the rear wall 26 of the fixed housing section 16. The hinged panel 50, FIG. 2, is normally padlocked as at 55.

Referring to FIG. 5, when it is necessary to reload the machine with newspapers, authorized personnel may open the lock 55 and the hinged panel 52, may reach in to the back of the machine and release the bolt 49 which, in turn, allows raising of the protective cover 47 as well as raising of the closure panel 50 after the movable housing section 17 is pulled to the extreme forward position of FIG. 5 where the panel 50 is out from under the top wall of the fixed housing section 16. The arms 37 may also be raised out of the way at this point and a fresh stack of papers may be loaded through the top of housing section 17 so as to rest on the top edges of tracks 25. After loading, the various closure parts are returned to their normally locked positions depicted in FIGS. 1 through 4.

The entire device is characterized by simplicity and durability, ease and convenience of operation, and comparative economy of manufacture. Many existing semi-honor vending machines in the field can be readily converted by the kit to the machine embodied in the invention, and newly manufactured machines can also be provided. In lieu of the cabinet 10, the two part box-within-a-box horizontally telescoping compartment 14 may be supported on a suitable open framework instead of an enclosed cabinet.

It should be mentioned finally in connection with FIG. 5 that the top wall of housing section 16 contains a hand clearance opening 56 through which access to the handle of bolt 49 may be had.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A newspaper vending machine comprising a stable support, a coin mechanism on said support including a control element released for movement when proper coins are placed in the mechanism, a storage compartment for newspapers on the support including a fixed box-like housing section having an open end and a movable box-like housing section telescoped within the fixed housing section and having a connection with said control element, spring means biasing the movable housing section to a retracted position in the fixed housing section, the fixed and movable housing sections having newspaper outlet openings in their bottoms adapted to register when the movable housing section is extended from the fixed housing section to a newspaper dispensing position, supporting means for an inclined stack of newspapers in the fixed housing section including a forward abutment plate to lap the lower edge portion of a forwardmost newspaper in the stack, a rear rest plate for the stack, and power means to advance the rest plate toward the abutment plate automatically as each forwardmost newspaper is dispensed through said outlet openings, and manual means on the movable housing section to lift each forwardmost newspaper in the stack and release its lower edge portion from behind the abutment plate and to shift the movable housing section to an extended newspaper dispensing position with said outlet openings in registry.

2. A newspaper vending machine as defined in claim 1, and said manual means comprising a pulling handle on the movable housing section and a pivoted lever on the movable housing section having a friction element within the movable housing section adapted to engage the forwardmost newspaper in said stack and lift the same.

3. A newspaper vending machine as defined in claim 2, and said friction element including a roller extending across the front of said stack and having a one-way active clutch means to prevent rotation of the roller during movement of the roller in the direction to lift a newspaper.

4. A newspaper vending machine as defined in claim 1, and a spring stabilizer means on the movable housing section and bearing yieldingly on the front of the stack of newspapers near the top of the stack.

5. A newspaper vending machine as defined in claim 1, and said power means comprising a carriage for said rest plate, guide tracks for the carriage fixed to the fixed housing section and having their forward ends secured to said forward abutment plate, and a spring motor drive means for the carriage having a connection with the forward abutment plate, whereby said rest plate is advanced automatically toward the abutment plate whenever a newspaper is dispensed from the front of the stack.

6. A newspaper vending machine as defined in claim 1, and a retainer flange for each newspaper being dispensed and disposed forwardly of said abutment plate in opposing relation thereto and forming therewith a wedge-like retainer recess for the lower edge portion of each newspaper being dispensed, said flange rising from the bottom wall of said movable housing section, the movable housing section having a horizontal axis of movement within the fixed housing section.

7. A newspaper vending machine as defined in claim 1, and a curved deflector plate on the bottom of said fixed housing section adjacent to the outlet opening thereof for guiding a dispensed newspaper with the aid of gravity to the hands of a customer.

8. A newspaper vending machine as defined in claim 1, and lockable and releasable closure means on said fixed and movable housing sections to allow access to the interior thereof by authorized personnel for loading the machine with newspapers.

9. A newspaper vending machine as defined in claim 8, and said access means including a security cover for said control element, and a manually releasable locking bolt means for the security cover operable from the outside of the machine only when said closure means is in a released condition.

10. A newspaper vending machine as defined in claim 1, and said stable support comprising a rectangular cabinet body having a top wall, said coin mechanism being fixedly mounted on said top wall, said storage compartment including said fixed and movable housing sections being disposed at least partly within said cabinet body below said top wall, and said cabinet having an empty compartment below said storage compartment adapted to receive weighting ballast.

* * * * *